(12) United States Patent
Nitanai et al.

(10) Patent No.: US 12,544,830 B2
(45) Date of Patent: Feb. 10, 2026

(54) METHOD FOR PRODUCING SILVER PARTICLES, THERMOSETTING RESIN COMPOSITION, SEMICONDUCTOR DEVICE, AND ELECTRICAL AND/OR ELECTRONIC COMPONENTS

(71) Applicant: KYOCERA Corporation, Kyoto (JP)

(72) Inventors: Yuya Nitanai, Yokohama (JP); Masakazu Fujiwara, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 110 days.

(21) Appl. No.: 17/636,436

(22) PCT Filed: Aug. 25, 2020

(86) PCT No.: PCT/JP2020/032043
§ 371 (c)(1),
(2) Date: Feb. 18, 2022

(87) PCT Pub. No.: WO2021/039794
PCT Pub. Date: Mar. 4, 2021

(65) Prior Publication Data
US 2022/0288680 A1    Sep. 15, 2022

(30) Foreign Application Priority Data

Aug. 26, 2019  (JP) ................................. 2019-153952

(51) Int. Cl.
| | | |
|---|---|---|
| *B22F 1/16* | (2022.01) | |
| *B22F 1/052* | (2022.01) | |
| *B22F 1/054* | (2022.01) | |
| *B22F 9/24* | (2006.01) | |
| *H01L 23/00* | (2006.01) | |
| *B23K 35/30* | (2006.01) | |

(52) U.S. Cl.
CPC ............. *B22F 1/16* (2022.01); *B22F 1/052* (2022.01); *B22F 1/0549* (2022.01); *B22F 9/24* (2013.01); *H01L 24/29* (2013.01); *B22F 2301/255* (2013.01); *B22F 2304/054* (2013.01); *B22F 2304/10* (2013.01); *B23K 35/3006* (2013.01); *H01L 24/32* (2013.01); *H01L 2224/2929* (2013.01); *H01L 2224/29339* (2013.01); *H01L 2224/29499* (2013.01); *H01L 2224/32225* (2013.01); *H01L 2224/32245* (2013.01); *H01L 2924/0635* (2013.01); *H01L 2924/0665* (2013.01); *Y10T 428/12049* (2015.01)

(58) Field of Classification Search
None
See application file for complete search history.

(56) References Cited

U.S. PATENT DOCUMENTS

| | | |
|---|---|---|
| 11,155,936 B2 | 10/2021 | Fukushima et al. |
| 2005/0207930 A1 | 9/2005 | Yamaguchi |
| 2009/0146117 A1 | 6/2009 | Suenaga et al. |
| 2011/0166243 A1 | 7/2011 | Kikuchi et al. |
| 2011/0256419 A1 | 10/2011 | Iwayama et al. |
| 2011/0318249 A1 | 12/2011 | Nakayama et al. |
| 2014/0346412 A1 | 11/2014 | Okamoto et al. |
| 2015/0115018 A1* | 4/2015 | Hori ............... B23K 31/12 252/514 |
| 2015/0247067 A1 | 9/2015 | Iseda et al. |
| 2016/0237322 A1 | 8/2016 | Shi |
| 2017/0033348 A1 | 2/2017 | Murakami |
| 2017/0110735 A1 | 4/2017 | Ito et al. |
| 2018/0369757 A1 | 12/2018 | Yasuda et al. |
| 2018/0369908 A1 | 12/2018 | Muto et al. |
| 2019/0088917 A1 | 3/2019 | Katada et al. |
| 2020/0035972 A1 | 1/2020 | Ahn et al. |
| 2020/0115543 A1 | 4/2020 | Yamoto et al. |
| 2022/0023939 A1* | 1/2022 | Fujii ................. B22F 1/00 |
| 2022/0288680 A1 | 9/2022 | Nitanai et al. |
| 2023/0104924 A1 | 4/2023 | Higgs et al. |
| 2024/0006716 A1 | 1/2024 | Takamori et al. |

FOREIGN PATENT DOCUMENTS

| | | |
|---|---|---|
| CN | 103396744 A | 11/2013 |
| CN | 104246910 A | 12/2014 |
| JP | 2003-257244 A | 9/2003 |
| JP | 2011-100573 A | 5/2011 |
| JP | 2011-238596 A | 11/2011 |
| JP | 2012-230866 A | 11/2012 |
| JP | 2012-253088 A | 12/2012 |
| JP | 2013-142173 A | 7/2013 |
| JP | 2014-080558 A | 5/2014 |
| JP | 2014-235942 A | 12/2014 |
| JP | 2015-014050 A | 1/2015 |
| JP | 2017-076517 A | 4/2017 |
| JP | 2017-101264 A | 6/2017 |
| WO | 2006/057348 A1 | 6/2006 |
| WO | WO-2019117234 A1 * | 6/2019 ............... B22F 1/00 |

OTHER PUBLICATIONS

United States Office Action issued on Aug. 6, 2025 for U.S. Appl. No. 18/042,894.

* cited by examiner

*Primary Examiner* — Xiaobei Wang
(74) *Attorney, Agent, or Firm* — Volpe Koenig

(57) ABSTRACT

Provided is a thermosetting resin composition containing: (A) silver particles including secondary particles having an average particle size from 0.5 to 5.0 μm, the secondary particles being formed by aggregation of primary particles having an average particle size from 10 to 100 nm; and (B) a thermosetting resin.

14 Claims, No Drawings

METHOD FOR PRODUCING SILVER PARTICLES, THERMOSETTING RESIN COMPOSITION, SEMICONDUCTOR DEVICE, AND ELECTRICAL AND/OR ELECTRONIC COMPONENTS

TECHNICAL FIELD

The present disclosure relates to a method of producing silver particles, a thermosetting resin composition, a semiconductor device, and electrical and/or electronic components.

BACKGROUND ART

In recent years, the efficiency of semiconductor elements has advanced, and this has increased the amount of heat generated by semiconductor elements, as well as their driving temperature. In addition, bonding materials need to have reliability and heat dissipation at high temperatures.

Examples of candidate bonding materials include solders and silver pastes, both of which have been conventionally used in the related field. However, these bonding materials exhibit insufficient reliability and heat dissipation and are therefore incompatible for such applications, and thus there is a demand for the provision of a bonding method suited for high temperature operations. For example, Patent Document 1 proposes a silver sintering paste using silver nanoparticles that exhibit excellent electrical conductivity due to low temperature firing.

CITATION LIST

Patent Literature

Patent Document 1: JP 2013-142173 A

SUMMARY OF INVENTION

The present disclosure relates to the following:

[1] A thermosetting resin composition including:
(A) a silver particle including secondary particles having an average particle size from 0.5 to 5.0 µm, the secondary particles being formed by aggregation of primary particles having an average particle size from 10 to 100 nm; and (B) a thermosetting resin.

[2] A semiconductor device formed by adhering a semiconductor element and a substrate through a die attach material containing the thermosetting resin composition described in [1].

[3] Electrical and/or electronic components formed by adhering a heat-dissipating member and a heat-generating member through a heat-dissipating member adhesive material containing the thermosetting resin composition described in [1].

[4] A method of producing a silver particle, the silver particle including secondary particles having an average particle size from 0.5 to 5.0 µm, the secondary particles being formed by aggregation of primary particles having an average particle size from 10 to 100 nm, the method including: obtaining a silver ammine complex solution by adding ammonia water to an aqueous solution containing a silver compound; and obtaining a silver particle-containing slurry by reducing, with a reducing compound, a silver ammine complex contained in the obtained silver ammine complex solution.

DESCRIPTION OF EMBODIMENTS

Hereinafter, the present disclosure will be described in detail with reference to an embodiment.

Thermosetting Resin Composition

The thermosetting resin composition of the present embodiment includes: (A) silver particles including secondary particles having an average particle size from 0.5 to 5.0 µm, the secondary particles being formed by aggregation of primary particles having an average particle size from 10 to 100 nm; and (B) a thermosetting resin.

Silver Particle (A)

The silver particles of the component (A) include secondary particles having an average particle size from 0.5 to 5.0 µm, the secondary particles being formed by aggregation of primary particles having an average particle size from 10 to 100 nm.

If the average particle size of the primary particles is less than 10 nm, the specific surface area increases, and workability of the thermosetting resin composition may decline, and if the average particle size exceeds 100 nm, sinterability may decline. From this perspective, the average particle size of the primary particles may be from 10 to 50 nm, or from 20 to 50 nm.

The average particle size of the primary particles can be measured in the following manner, and specifically, it can be measured by a method described in the examples.

The silver particles are embedded in an epoxy resin at curing conditions including a temperature of 60° C. for 120 minutes. The resulting product is then subjected to planar milling using a focused ion beam (FIB) device under conditions including a machining voltage of 4.0 kV, an inclination angle of 80°, and a machining time of 1.5 minutes. The equivalent circle diameters for 200 silver particles are measured by observing the cross sections of the obtained spherical silver particles using a field emission scanning electron microscope (FE-SEM) under conditions including an acceleration voltage of 1.0 kV and a magnification from 10000 to 200000. The equivalent circle diameter of the 200 measured silver particles is determined through image processing using image analysis software, and an average of the 200 measured silver particles is obtained.

Furthermore, if the average particle size of the secondary particles is less than 0.5 µm, storage stability may decline, and if the average particle size exceeds 5.0 µm, sinterability may decline. From this perspective, the average particle size of the secondary particles may be from 0.5 to 3.0 µm or from 1.0 to 3.0 µm.

The average particle size of the secondary particles is a particle size (50% particle size D50) at which the cumulative volume reaches 50% in a particle size distribution measured using a laser diffraction particle size distribution measurement device, and specifically, the average particle size can be measured by the method described in the examples.

The silver particles of the component (A) are secondary particles in which nano-sized primary particles are aggregated, and thereby the silver particles maintain the high activity level of the surface of the primary particles and exhibit sinterability (self-sinterability) between secondary particles at low temperatures. Sintering of the silver particles progresses in parallel with sintering of the silver particles and the bonding member. Therefore, a thermosetting resin composition that has excellent thermal conductivity, low thermal resistance, and excellent adhesive properties can be obtained by using the silver particles of the component (A).

The shape of the silver particles of the component (A) is not particularly limited, and examples thereof include spherical and flake-shaped. The shape of the silver particles of the component (A) is preferably spherical.

Moreover, the silver particles of the component (A) may be hollow particles or solid particles, but are preferably hollow particles from the perspective of low temperature sinterability. Here, a hollow particle means a particle having a void within the particle. If the silver particles of the component (A) are hollow particles, a void may be present in a center portion of the silver particles. Also, a solid particle means a particle that is substantially free of a space within the particle.

The tap density of the silver particles of the component (A) may be from 4.0 to 7.0 $g/cm^3$, from 4.5 to 7.0 $g/cm^3$, or from 4.5 to 6.5 $g/cm^3$. When the tap density of the silver particles is 4.0 $g/cm^3$ or higher, the thermosetting resin composition can be filled with the silver particles at a high level, and if the tap density is less than or equal to 7.0 $g/cm^3$, sedimentation of the silver particles in the thermosetting resin composition can be reduced.

The tap density of the silver particles can be measured on the basis of the ASTM standard test method B 527 using a tap density measuring device, and specifically can be measured by the method described in the examples.

The specific surface area of the silver particles of the component (A), as determined by the BET method, may be from 0.5 to 1.5 $m^2/g$, may be from 0.5 to 1.2 $m^2/g$, or may be from 0.6 to 1.2 $m^2/g$. When the specific surface area of the silver particles is 0.5 $m^2/g$ or higher, contact among silver particles can be increased, and when the specific surface area is less than or equal to 1.5 $m^2/g$, the viscosity of the thermosetting resin composition can be reduced.

The specific surface area of the silver particles can be measured by the single point BET method through nitrogen adsorption using a specific surface area measuring device, and specifically can be measured by the method described in the examples.

The silver particles of the component (A) may further have a positive thermal expansion coefficient at temperatures between 150° C. and 300° C., which is the firing temperature range. The thermal expansion coefficient of the silver particles (A) may be from 0.2 to 10.0 ppm/° C., or may be from 1.5 to 8.0 ppm/° C.

In the present disclosure, the thermal expansion coefficient of the silver particles is determined by applying a load of 200 kgf to silver particles of Ag powder for 1 minute using a mini hydraulic press (available from Specac Inc.) to produce a cylindrical pellet-shaped sample having a diameter of 5 mm and a thickness of 1 mm, then heating the obtained sample from ambient temperature (25° C.) to 350° C. at a temperature increase rate of 20° C./minute using a thermomechanical analysis (TMA) device (product name: TMA SS150, available from Seiko Instruments Inc.), and then measuring the thermal expansion under these conditions. In addition, the thermal expansion coefficient when based on the pellet length at 25° C. is adopted as the thermal expansion coefficient between 150° C. and 300° C., which is the firing temperature range.

Also, the sintering onset temperature of the silver particles having a positive linear expansion coefficient is the temperature at the time at which shrinkage starts, that is, the temperature at the time at which the thermal expansion coefficient is maximized. Typically, the temperature range is between 150 to 300° C.

Silver nanoparticles configuring a silver sintering paste shrink significantly due to sintering, and the rate of change in thermal resistance before and after reliability testing is large. Therefore, a demand exists for a silver sintering paste with small shrinkage and a small rate of change in thermal resistance before and after reliability testing.

When the temperature at which the silver particles of the component (A) exhibit the thermal expansion coefficient is within the range described above, opportunities for contact between silver particles are increased due to the expansion of the silver particles during sintering, and therefore the thermosetting resin composition exhibits favorable sinterability and high thermal conductivity. At the same time, volume shrinkage during sintering is offset, and therefore, the rate of change in thermal resistance is reduced.

The content of the silver particles of the component (A) in the thermosetting composition may be from 20 to 95 mass % or from 40 to 90 mass %.

The thermosetting composition may contain silver particles other than the silver particles of the component (A). When the thermosetting composition contains silver particles other than the silver particles of the component (A), the content of the silver particles other than the silver particles of the component (A) in the thermosetting composition may be 35 mass % or less, 25 mass % or less, 10 mass % or less, or 5 mass % or less.

Method of Producing Silver Particle (A)

The method of producing silver particles of the component (A) includes: a step of obtaining a silver ammine complex solution by adding ammonia water to an aqueous solution containing a silver compound; and a step of obtaining a silver particle-containing slurry by reducing, with a reducing compound, a silver ammine complex in the silver ammine complex solution obtained in the previous step.

Step of Obtaining a Silver Ammine Complex Solution

In this step, ammonia water is added to an aqueous solution containing a silver compound, and a silver amine complex solution is obtained.

Examples of the silver compound include silver nitrate, silver chloride, silver acetate, silver oxalate, and silver oxide. From the perspective of solubility in water, the silver compound is preferably silver nitrate or silver acetate.

The added amount of ammonia may be, per mole of silver in the aqueous solution containing a silver compound, from 2 to 50 mol, from 5 to 50 mol, or from 10 to 50 mol. When the added amount of ammonia is within the range described above, the average particle size of the primary particles can be within the range described above.

Step of Obtaining a Silver Particle-Containing Slurry

In this step, the silver ammine complex contained in the silver ammine complex solution obtained in the step described above is reduced by a reducing compound, and a silver particle-containing slurry is obtained.

Reduction of the silver ammine complex using a reducing compound causes the primary particles of the silver particles in the silver ammine complex to aggregate and thereby form secondary particles (hollow particles) having a void in the center.

Aggregation of the primary particles can be controlled by appropriately adjusting the amount of silver in the silver ammine complex and the content of the reducing compound, and thereby the average particle size of the obtained secondary particles can be set to within the range described above.

The reducing compound is not particularly limited as long as the reducing compound can reduce the silver ammine complex and cause the silver to precipitate. Examples of the reducing compound include hydrazine derivatives. Examples of the hydrazine derivative include hydrazine monohydrate, methylhydrazine, ethylhydrazine, n-propylhydrazine, i-propylhydrazine, n-butylhydrazine, i-butylhydrazine, sec-butylhydrazine, t-butylhydrazine, n-pentylhydrazine, i-pentylhydrazine, neo-pentylhydrazine, t-pentylhydrazine, n-hexylhydrazine, i-hexylhydrazine, n-heptylhydrazine, n-octylhydrazine, n-nonylhydrazine, n-decylhydrazine, n-undecylhydrazine, n-dodecylhydrazine, cyclohexylhydrazine, phenylhydrazine, 4-methylphenylhydrazine, benzylhydrazine, 2-phenylethylhydrazine, 2-hydrazinoethanol, and acetohydrazine. These may be used alone or in combination of two or more.

The content of the reducing compound may be, per mole of silver in the silver ammine complex, from 0.25 to 20.0 mol, from 0.25 to 10.0 mol, or from 0.25 to 5.0 mol. When the content of the reducing compound is within the range described above, the average particle size of the obtained secondary particles can be set to within the range described above.

Furthermore, the temperature of the silver ammine complex solution when reducing the silver amine complex may be lower than 30° C., or may be from 0 to 20° C. If the temperature of the silver ammine complex solution is within this range, aggregation of the primary particles can be controlled, and the average particle size of the obtained secondary particles can be set to within the range described above.

Step of Introducing a Protecting Group into the Silver Particles

The method for producing silver particles of the component (A) may further include, after the step of obtaining the silver particle-containing slurry, a step of introducing a protecting group into the silver particles by adding an organic protecting compound to the silver particle-containing slurry obtained in the aforementioned step.

Examples of the organic protecting compound include carboxylic acids, amines, and amides. From the perspective of increasing dispersibility, the organic protecting compound is preferably a carboxylic acid.

Examples of the carboxylic acid include monocarboxylic acids, such as formic acid, acetic acid, propionic acid, butyric acid, valeric acid, caproic acid, caprylic acid, octylic acid, nonanoic acid, capric acid, oleic acid, stearic acid, and isostearic acid; dicarboxylic acids, such as oxalic acid, malonic acid, succinic acid, glutaric acid, adipic acid, pimelic acid, suberic acid, azelaic acid, sebacic acid, and diglycolic acid; aromatic carboxylic acids, such as benzoic acid, phthalic acid, isophthalic acid, terephthalic acid, salicylic acid, and gallic acid; and hydroxy acids, such as glycolic acid, lactic acid, tartronic acid, malic acid, glyceric acid, hydroxybutyric acid, tartaric acid, citric acid, and isocitric acid.

The compounded amount of the organic protecting compound may be from 1 to 20 mmol, from 1 to 10 mmol, or from 1 to 5 mmol per 1 mol, per mole of silver particles.

When the compounded amount of the organic protecting compound is 1 mmol or greater, the silver particles can be dispersed in the resin, and if the compounded amount is less than or equal to 20 mmol, the silver particles can be dispersed in the resin without impairing sinterability.

Thermosetting Resin (B)

The thermosetting resin (B) is not particularly limited, and any thermosetting resin can be used as long as the thermosetting resin is one that is generally used in adhesive applications. The thermosetting resin may be a liquid resin or a resin that is liquid at room temperature (25° C.). The thermosetting resin may be at least one type selected from cyanate resins, epoxy resins, acrylic resins, and maleimide resins. These may be used alone or in a combination of two or more.

The cyanate resin is a compound having a —NCO group in the molecule, and is a resin that is cured by forming a three-dimensional mesh structure upon reaction of the —NCO groups by heating. Specific examples include 1,3-dicyanatobenzene, 1,4-dicyanatobenzene, 1,3,5-tricyanatobenzene, 1,3-dicyanatonaphthalene, 1,4-dicyanatonaphthalene, 1,6-dicyanatonaphthalene, 1,8-dicyanatonaphthalene, 2,6-dicyanatonaphthalene, 2,7-dicyanatonaphthalene, 1,3,6-tricyanatonaphthalene, 4,4'-dicyanatobiphenyl, bis(4-cyanatophenyl)methane, bis(3,5-dimethyl-4-cyanatophenyl) methane, 2,2-bis(4-cyanatophenyl)propane, 2,2-bis(3,5-dibromo-4-cyanatophenyl)propane, bis(4-cyanatophenyl) ether, bis(4-cyanatophenyl)thioether, bis(4-cyanatophenyl) sulfone, tris(4-cyanatophenyl)phosphite, tris(4-cyanatophenyl)phosphate, and cyanates obtained by a reaction between a novolac resin and a cyanogen halide In addition, a prepolymer having a triazine ring formed by trimerizing cyanate groups of these polyfunctional cyanate resins can also be used. The prepolymer is obtained by polymerizing the polyfunctional cyanate resin monomer described above, using as a catalyst, for example, an acid such as a mineral acid or a Lewis acid, a base such as a sodium alcoholate or a tertiary amine, or a salt such as sodium carbonate.

A commonly known curing accelerator can be used as the curing accelerator for the cyanate resin. Examples thereof include, but are not limited to, organometallic complexes, such as zinc octylate, tin octylate, cobalt naphthenate, zinc naphthenate, and iron(III) acetylacetone; metal salts, such as aluminum chloride, tin chloride, and zinc chloride; and amines, such as triethylamine, and dimethylbenzylamine. A single type of these curing accelerators can be used, or two or more types can be mixed and used.

The epoxy resin is a compound having one or more glycidyl groups per molecule, and is a resin that is cured by forming a three-dimensional mesh structure upon reaction of the glycidyl groups by heating. The epoxy resin may be a compound containing two or more glycidyl groups per molecule. This is because sufficient cured product properties cannot be exhibited with only a compound having one glycidyl group per molecule, even when the compound is reacted. A compound having two or more glycidyl groups per molecule can be obtained by epoxidizing a compound having two or more hydroxyl groups. Examples of such compounds include, but are not limited to, bifunctional compounds obtained by epoxidizing, for example, bisphenol compounds or derivatives thereof, such as bisphenol A, bisphenol F, and biphenol, diols having an alicyclic structure or derivatives thereof, such as hydrogenated bisphenol A, hydrogenated bisphenol F, hydrogenated bisphenol, cyclohexanediol, cyclohexanedimethanol, and cyclohexanediethanol, and aliphatic diols and derivatives thereof, such as butanediol, hexanediol, octanediol, nonanediol, and decanediol; trifunctional compounds obtained by epoxidizing compounds having a trihydroxyphenyl methyl skeleton or an aminophenol skeleton; and polyfunctional compounds obtained by epoxidizing a phenolic novolac resin, a cresol novolac resin, a phenol aralkyl resin, a biphenyl aralkyl resin, or a naphthol aralkyl resin. Furthermore, the thermosetting resin composition is formed into a paste at room temperature (25° C.), and therefore the epoxy resin may be a liquid at room temperature (25° C.) by itself or as a mixture. A reactive diluent can also be used, as is customary. Examples of the reactive diluent include monofunctional aromatic glycidyl ethers, such as phenyl glycidyl ether and cresyl glycidyl ether, and aliphatic glycidyl ethers.

Examples of a curing agent for the epoxy resin include aliphatic amines, aromatic amines, dicyandiamides, dihydrazide compounds, acid anhydrides, and phenol resins. Examples of the dihydrazide compounds include carboxylic acid dihydrazides, such as adipic acid dihydrazide, dodecanoic acid dihydrazide, isophthalic acid dihydrazide, and p-oxybenzoic acid dihydrazide. Examples of the acid anhydrides include phthalic anhydride, tetrahydrophthalic anhydride, hexahydrophthalic anhydride, endomethylene tetrahydrophthalic anhydride, dodecenylsuccinic anhydride, a reaction product between maleic anhydride and polybutadiene, and a copolymer of maleic anhydride and styrene.

Furthermore, a curing accelerator can be compounded to facilitate curing, and examples of the curing accelerator for the epoxy resin include imidazoles, triphenylphosphine or tetraphenylphosphine and salts thereof, and amine-based compounds and salts thereof, such as diazabicycloundecene. The curing accelerator may be an imidazole compound such as 2-methylimidazole, 2-ethylimidazole, 2-phenylimidazole, 2-phenyl-4-methylimidazole, 2-phenyl-4-methyl-5-hydroxymethyl imidazole, 2-phenyl-4,5-dihydroxymethyl imidazole, 2-$C_{11}H_{23}$-imidazole, or an adduct of 2-methylimidazole and 2,4-diamino-6-vinyltriazine. An imidazole compound having a melting point of 180° C. or higher may be used.

Examples of the acrylic resin include (meth)acrylates having a hydroxyl group, such as 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, 4-hydroxybutyl (meth)acrylate, 1,2-cyclohexanediol mono(meth)acrylate, 1,3-cyclohexanediol mono(meth)acrylate, 1,4-cyclohexanediol mono(meth)acrylate, 1,2-cyclohexane dimethanol mono(meth)acrylate, 1,3-cyclohexane dimethanol mono(meth)acrylate, 1,4-cyclohexane dimethanol mono(meth)acrylate, 1,2-cyclohexane diethanol mono(meth)acrylate, 1,3-cyclohexane diethanol mono(meth)acrylate, 1,4-cyclohexane diethanol mono(meth)acrylate, glycerol mono(meth)acrylate, glycerol di(meth)acrylate, trimethylolpropane mono(meth)acrylate, trimethylolpropane di(meth)acrylate, pentaerythritol mono(meth)acrylate, pentaerythritol di(meth)acrylate, pentaerythritol tri(meth)acrylate, and neopentylglycol mono(meth)acrylate; and (meth)acrylates having a carboxyl group, obtained by reacting these (meth)acrylates having a hydroxyl group with a carboxylic acid or derivative thereof. Examples of dicarboxylic acids that can be used herein include oxalic acid, malonic acid, succinic acid, glutaric acid, adipic acid, pimelic acid, suberic acid, azelaic acid, sebacic acid, maleic acid, fumaric acid, phthalic acid, tetrahydrophthalic acid, hexahydrophthalic acid, and derivatives thereof.

Furthermore, examples of the acrylic resin include compounds having a (meth)acrylic group, including polyethers, polyesters, polycarbonates, and poly(meth)acrylates having a molecular weight from 100 to 10000; (meth)acrylates having a hydroxy group; and (meth)acrylamides having a hydroxy group.

The maleimide resin is a compound containing one or more maleimide groups per molecule, and is a resin that is cured by forming a three-dimensional mesh structure upon reaction of the maleimide groups by heating. Examples of the maleimide resin include bismaleimide resins such as N,N'-(4,4'-diphenylmethane) bismaleimide, bis(3-ethyl-5-methyl-4-maleimidophenyl) methane, and 2,2-bis[4-(4-maleimidophenoxy)phenyl] propane. The maleimide resin may be a compound obtained by reacting a dimer acid diamine with maleic anhydride; or a compound obtained by reacting a maleimidated amino acid such as maleimidoacetic acid or maleimidocaproic acid, with a polyol. The maleimidated amino acid is obtained by reacting maleic anhydride with aminoacetic acid or aminocaproic acid. The polyol may be a polyether polyol, a polyester polyol, a polycarbonate polyol, or a poly(meth)acrylate polyol, or may be free of aromatic rings.

The thermosetting resin (B) may be contained in an amount from 1 to 20 parts by mass or from 5 to 18 parts by mass, relative to 100 parts by mass of the silver particles (A). When the content of the thermosetting resin (B) is not less than 1 part by mass, adhesiveness due to the thermosetting resin can be obtained, and when the content of the thermosetting resin (B) is not greater than 20 parts by mass, a decrease in the proportion of the silver component can be suppressed, a high level of thermal conductivity can be sufficiently ensured, and heat dissipation can be improved. Furthermore, at such a content of the thermosetting resin (B), the amount of organic components is not excessive, and deterioration due to light and heat can be suppressed, and as a result, the lifespan of a light-emitting device can be increased.

The total content of the silver particles (A) and the thermosetting resin (B) in the thermosetting composition may be from 30 to 99 mass % or from 50 to 98 mass %.

Diluent (C)

The thermosetting resin composition of the present embodiment may further contain a diluent (C) from the perspective of workability. Examples of the diluent (C) include butyl carbitol, cellosolve acetate, ethyl cellosolve, butyl cellosolve, butyl cellosolve acetate, butyl carbitol acetate, diethylene glycol dimethyl ether, diacetone alcohol, N-methyl-2-pyrrolidone (NMP), dimethylformamide, N,N-dimethylacetamide (DMAc), γ-butyrolactone, 1,3-dimethyl-2-imidazolidinone, and 3,5-dimethyl-1-adamantanamine (DMA). These may be used alone or in a combination of two or more.

When the thermosetting resin composition of the present embodiment contains the diluent (C), the content thereof may be from 3 to 20 parts by mass, from 4 to 15 parts by mass, or from 4 to 10 parts by mass, relative to 100 parts by mass of the silver particles (A). When the content of the diluent (C) is 3 parts by mass or greater, the viscosity can be reduced through dilution, and when the content is less than or equal to 20 parts by mass, the generation of voids when curing the thermosetting resin composition of the present embodiment can be controlled.

Other Components

In addition to the components described above, the thermosetting resin composition of the present embodiment can contain, as necessary, other components that are generally compounded in this type of composition, examples of the other components including stress-lowering agents, such as rubber or silicone; coupling agents; antifoaming agents; surfactants; coloring agents such as pigments or dyes; various polymerization inhibitors; antioxidants; solvents; and various other additives. Each of these additives may be used alone, or two or more may be mixed and used.

The thermosetting resin composition of the present embodiment can be prepared by thoroughly mixing the above-described silver particles (A), the thermosetting resin (B), and as necessary, the diluent (C) and other various additives, and then kneading the mixture using a disperser, a kneader, a 3-roll mill, or the like, and subsequently defoaming the mixture.

The thermal conductivity of a cured product of the thermosetting resin composition of the present embodiment may be 35 W/mK or higher, or may be 40 W/mK or higher.

The thermal resistance of the cured product of the thermosetting resin composition of the present embodiment may be less than or equal to 0.5 K/W, or may be less than or equal to 0.3 K/W.

The thermal conductivity and thermal resistance can be measured by the respective methods described in the examples.

The viscosity of the thermosetting resin composition of the present embodiment may be from 70 to 200 Pa·s, or may be from 100 to 200 Pa·s.

The viscosity is a value measured at 25° C. using an E-type viscometer (3° cone). Specifically, the viscosity can be measured by the method described in the examples.

The thermosetting resin composition of the present embodiment has excellent dispersibility and adhesion characteristics at low viscosity, and can be used to obtain a cured product having excellent thermal conductivity, low thermal resistance, and excellent low-stress properties with minimal volume shrinkage, and therefore the thermosetting resin composition of the present embodiment can be used, for example, as a die attach material for element adhesion or as a material for adhering a heat-dissipating member.

Semiconductor Device and Electrical and/or Electronic Components

The semiconductor device of the present embodiment is formed by adhering a semiconductor element and a substrate through a die attach material containing the thermosetting resin composition described above. Furthermore, the electrical and/or electronic components of the present embodiment are formed by adhering a heat-dissipating member and a heat-generating member through a heat-dissipating member adhesive material containing the thermosetting resin composition described above. Therefore, the semiconductor device and the electrical and/or electronic components of the present embodiment have excellent reliability.

The semiconductor element may be any known semiconductor element, and examples thereof include transistors and diodes. Further examples of the semiconductor element include a light-emitting element such as an LED. The type of light-emitting element is not particularly limited, and examples thereof include those in which a nitride semiconductor, such as InN, AN, GaN, InGaN, AlGaN, or InGaAlN is formed as a light-emitting layer on a substrate by a method such as the MOBVC method.

Moreover, examples of an element support member include a support member formed of a material such as copper, copper-plated copper, a pre-plated lead frame (PPF), glass epoxy, and ceramic.

By using the die attach material of the present embodiment, the semiconductor element can also be bonded to a base material that has not been metal plated. The connection reliability of the semiconductor device obtained in this manner with respect to the temperature cycle after mounting is dramatically improved compared to that of conventional semiconductor devices. Furthermore, the electrical resistance value is sufficiently small with minimal change over time, and thus an advantage of achieving a long useful life with minimal reduction over time in output even when driven for a long period of time is achieved.

The heat-generating member may be the semiconductor element described above or a member including the semiconductor element, or may be a heat-generating member other than the semiconductor element. Examples of the heat-generating member other than the semiconductor element include optical pickups and power transistors. In addition, examples of the heat-dissipating member include heat sinks and heat spreaders.

By adhering the heat-dissipating member to the heat-generating member using the heat-dissipating member adhesive material in this manner, heat generated by the heat-generating member can be efficiently released to the outside from the heat-dissipating member, and thus a temperature increase of the heat-generating member can be suppressed. Note that the heat-generating member and the heat-dissipating member may be adhered directly through the heat-dissipating member adhesive material, or may be indirectly adhered with another member having a high thermal conductivity sandwiched in between.

EXAMPLES

Next, the present disclosure will be specifically described through examples; however, the present disclosure is not limited in any way to these examples.

Production of Silver Particles

Synthesis Example 1

A silver nitrate aqueous solution was prepared by dissolving 40 g of silver nitrate in 10 L of ion-exchanged water, after which 203 mL of ammonia water having a concentration of 26 mass % was added to the silver nitrate aqueous solution, and the mixture was stirred, and thereby a silver ammine complex aqueous solution was obtained. This aqueous solution was brought to a liquid temperature of 10° C., and 28 mL of a 20 mass % aqueous solution of hydrazine monohydrate was added dropwise over a period of 60 seconds while stirring to precipitate silver particles, and a silver particle-containing slurry was obtained. Next, oleic acid was added into this slurry at an amount of 1 mass % relative to the amount of silver, and the mixture was stirred for 10 minutes. The slurry was then filtered, and the filtered product was washed with water, then washed with methanol, and then dried in a vacuum atmosphere at 60° C. for 24 hours to obtain silver particles having an average particle size of primary particles of 20 nm, an average particle size of secondary particles of 1.1 μm, a maximum thermal expansion coefficient of +5.5 ppm/° C., a tap density of 5.4 g/cm$^3$, and a specific surface area of 1.2 m$^2$/g.

Note that when the cross-section of the obtained silver particles was observed using a field emission scanning electron microscope (FE-SEM) (JSM-6700 F, available from JEOL Ltd.), the silver particles were confirmed to be hollow particles having a void in the center.

Synthesis Example 2

A silver nitrate aqueous solution was prepared by dissolving 40 g of silver nitrate in 10 L of ion-exchanged water, after which 203 mL of ammonia water having a concentration of 26 mass % was added to the silver nitrate aqueous solution, and the mixture was stirred, and thereby a silver ammine complex aqueous solution was obtained. This aqueous solution was brought to a liquid temperature of 10° C., and 18 mL of a 20 mass % aqueous solution of hydrazine monohydrate was added dropwise over a period of 60 seconds while stirring to precipitate silver particles, and a silver particle-containing slurry was obtained. Next, oleic acid was added into this slurry at an amount of 1 mass % relative to the amount of silver, and the mixture was stirred for 10 minutes. The slurry was then filtered, and the filtered product was washed with water, then washed with methanol, and then dried in a vacuum atmosphere at 60° C. for 24 hours to obtain silver particles having an average particle size of primary particles of 20 nm, an average particle size of secondary particles of 1.5 μm, a maximum thermal expansion coefficient of +7.0 ppm/° C., a tap density of 5.2 g/cm$^3$, and a specific surface area of 1.1 m$^2$/g.

Synthesis Example 3

A silver nitrate aqueous solution was prepared by dissolving 40 g of silver nitrate in 10 L of ion-exchanged water, after which 203 mL of ammonia water having a concentration of 26 mass % was added to the silver nitrate aqueous solution, and the mixture was stirred, and thereby a silver ammine complex aqueous solution was obtained. This aqueous solution was brought to a liquid temperature of 10° C., and 12 mL of a 20 mass % aqueous solution of hydrazine monohydrate was added dropwise over a period of 60 seconds while stirring to precipitate silver particles, and a silver particle-containing slurry was obtained. Next, oleic acid was added into this slurry at an amount of 1 mass % relative to the amount of silver, and the mixture was stirred for 10 minutes. The slurry was then filtered, and the filtered product was washed with water, then washed with methanol, and then dried in a vacuum atmosphere at 60° C. for 24 hours to obtain silver particles having an average particle size of primary particles of 20 nm, an average particle size of secondary particles of 2.6 μm, a maximum thermal expansion coefficient of +7.4 ppm/° C., a tap density of 5.0 g/cm$^3$, and a specific surface area of 1.0 m$^2$/g.

The silver particles obtained in Synthesis Examples 1 to 3 were evaluated by the following methods.

Average Particle Size of Primary Particles

To measure the average particle size of the primary particles, 2.8 mL of a 20 mass % aqueous solution of hydrazine monohydrate was added dropwise over a period of 60 seconds to 1020 mL of the silver ammine complex aqueous solution obtained in each of the above synthesis examples, the mixture was subjected to a solid-liquid separation, and the obtained solid was washed with pure water and dried in a vacuum atmosphere at 60° C. for 24 hours, and silver particles thereby obtained were used.

The average particle size of the primary particles was measured as follows.

The silver particles were embedded in EpoHeat CLR (available from Buehler Ltd.) at curing conditions including a temperature of 60° C. for 120 minutes. The EpoHeat CLR resin embedded with the silver particles was then subjected to planar milling using a focused ion beam (FIB) device (JEM-9310FIB, available from JEOL, Ltd.) under conditions including a machining voltage of 4.0 kV, an inclination angle of 80°, and a machining time of 1.5 minutes. The equivalent circle diameters of 200 silver particles were measured by observing the cross sections of the obtained spherical silver particles using a field emission scanning electron microscope (FE-SEM) (JSM-6700F, available from JEOL, Ltd.) under conditions including an acceleration voltage of 1.0 kV and a magnification from 10000 to 200000. The equivalent circle diameters of the 200 measured silver particles were determined through image processing using the image analysis software ImageJ (available from the National Institutes of Health), and an average of the quantity thereof was then determined.

Average Particle Size of Secondary Particles

The average particle size of the secondary particles was determined from the particle size (50% particle size D50) at which the cumulative volume was 50% in a particle size distribution measured using a laser diffraction-type particle size distribution measurement device (product name: SALD-7500nano, available from Shimadzu Corporation).

Thermal Expansion Coefficient

A cylindrical pellet-shaped sample having a diameter of 5 mm and a thickness of 1 mm was obtained by applying a load of 200 kgf to the silver particles for 1 minute using a mini hydraulic press (available from Specac Inc.). The thermal expansion coefficient of the sample was measured using a thermomechanical analysis (TMA) device (product name: TMA SS150, available from Seiko Instruments Inc.) under conditions that included increasing the temperature of the sample from ambient temperature (25° C.) to 350° C. at a temperature increase rate of 20° C./minute. The thermal expansion coefficient was determined based on the pellet length at 25° C., and the thermal expansion coefficient that became a maximum in a temperature range from 150° C. to 300° C., which is the firing temperature range, was used as the maximum thermal expansion coefficient.

Tap Density

The tap density (TD) was measured as the mass per unit volume (units: g/cm$^3$) of silver particles in a vibrated container using a tap density measuring instrument (Tap-Pak Volumeter, available from Thermo Scientific) on the basis of the ASTM standard test method B 527.

Specific Surface Area

The silver particles were degassed for 10 minutes at 60° C., and then the specific surface area was measured by the single point BET method through nitrogen adsorption using a specific surface area measuring device (Monosorb, available from Quantachrome Corporation).

Examples 1 to 8 and Comparative Examples 1 to 5

The components were mixed according to the formulations in Table 1 and kneaded in a three-roll mill to obtain respective thermosetting resin compositions. The obtained thermosetting resin compositions were evaluated by the method described below. The results are shown in Table 1. Note that a blank cell in Table 1 indicates that the given component was not blended.

The materials listed in Table 1 and used in the Examples and Comparative Examples are as follows.

Silver Particles (A)

A1: Silver particles obtained in Synthesis Example 1 (average particle size of primary particles: 20 nm, average particle size of secondary particles: 1.1 µm, maximum thermal expansion coefficient: +5.5 ppm/° C., tap density: 5.4 g/cm$^3$, specific surface area: 1.2 m$^2$/g)

A2: Silver particles obtained in Synthesis Example 2 (average particle size of primary particles: 20 nm, average particle size of secondary particles: 1.5 µm, maximum thermal expansion coefficient: +7.0 ppm/° C., tap density: 5.2 g/cm$^3$, specific surface area: 1.1 m$^2$/g)

A3: Silver particles obtained in Synthesis Example 3 (average particle size of primary particles: 20 nm, average particle size of secondary particles: 2.6 µm, maximum thermal expansion coefficient: +7.4 ppm/° C., tap density: 5.0 g/cm$^3$, specific surface area: 1.0 m$^2$/g)

Silver Particles Other than Component (A)

TC-505C (available from Tokuriki Honten Co., Ltd., product name, average particle size: 1.93 µm, maximum thermal expansion coefficient: −0.1 ppm/° C., tap density: 6.25 g/cm$^3$, specific surface area: 0.65 m$^2$/g)

Ag-HWQ 1.5 µm (available from Fukuda Metal Foil & Powder Co., Ltd., product name, average particle size: 1.8 µm; maximum thermal expansion coefficient: −0.6 ppm/° C.; tap density: 3.23 g/cm$^3$; specific surface area: 0.5 m$^2$/g)

AgC-221PA (available from Fukuda Metal Foil & Powder Co., Ltd., product name, average particle size: 7.5 µm; maximum thermal expansion coefficient: −0.1 ppm/° C.; tap density: 5.7 g/cm$^3$; specific surface area: 0.3 m$^2$/g)

DOWA Ag nano powder-1 (available from DOWA Electronics Materials Co., Ltd., product name, average particle size: 20 nm; maximum thermal expansion coefficient: −0.1 ppm/° C.)

DOWA Ag nano powder-2 (available from DOWA Electronics Materials Co., Ltd., product name, average particle size: 60 nm; maximum thermal expansion coefficient: −0.1 ppm/° C.)

Thermosetting Resin (B)

Epoxy resin: (available from Mitsubishi Chemical Corporation, product name: YL983U)

Acrylic resin (available from KJ Chemicals Corporation, product name: HEAA (trade name))

Bisphenol F (available from Honshu Chemical Industry Co., Ltd., product name: Bisphenol F)

Diluent (C)

Butyl carbitol (available from Tokyo Chemical Industry Co., Ltd.)

Other Components

Imidazole (available from Shikoku Chemicals Corporation, product name: Curezol 2P4MHZ-PW)

Dicumyl peroxide (available from NOF Corporation, product name: Percumyl (trade name) D)

Evaluation Method

Thermal Conductivity

Measuring instrument: LFA-502 (available from Kyoto Electronics Manufacturing Co., Ltd.)
Measurement Method: Laser Flash Method The thermal conductivity of a cured product of the thermosetting resin composition was measured in accordance with JIS R 1611-1997 by the laser flash method using the measuring instrument indicated above.

Volume Resistivity

A glass substrate (thickness: 1 mm) was coated with the thermosetting resin composition to have a thickness of 30 µm using a screen printing method, and then cured at 190° C. for 60 minutes. The volume resistivity of the obtained wiring was measured by a 4-terminal method using the resistivity meter MCP-T600 (product name, available from Mitsubishi Chemical Corporation).

Viscosity

The viscosity value at a temperature of 25° C. and a rotational speed of 0.5 rpm was measured using an E-type viscometer (available from Toki Sangyo Co., Ltd., product name: VISCOMETER-TV22, applied cone plate-type rotor: 3°×R17.65).

Thixotropic Index

The viscosity was measured at rotational speeds of both 0.5 rpm and 2.5 rpm at a temperature of 25° C. using an E-type viscometer (available from Toki Sangyo Co., Ltd., product name: VISCOMETER-TV22, applied cone plate-type rotor: 3°×R17.65), and the thixotropic index was expressed as a ratio of the viscosity values ((viscosity measured at 0.5 rpm)/(viscosity measured at 2.5 rpm)).

Pot Life

The thermosetting resin composition was left standing in a constant-temperature bath at 25° C., and the number of days until the viscosity of the thermosetting resin composition increased to 1.5 times or more of the initial viscosity was measured.

Thermal Resistance

The thermosetting resin composition was used to mount, onto a copper substrate that had been Ag plated on the surface, a TEG chip for thermal resistance having a gold vapor-deposited layer provided on a 5 mm×5 mm bonding surface, and then the thermosetting resin composition was cured at 190° C. for 60 minutes to produce a semiconductor package. The thermal resistance of the bonded part of the semiconductor package was measured at room temperature (25° C.) using the T3Ster thermal resistance measuring device available from Mentor Graphics Japan Co., Ltd.

Warpage

The thermosetting resin composition was used to mount, onto a copper substrate that had been Ag plated on the surface, a back surface gold silicon chip having a gold vapor-deposited layer provided on an 8 mm×8 mm bonding surface, and then the thermosetting resin composition was cured at 190° C. for 60 minutes to produce a semiconductor package. The package warpage of the semiconductor package was measured at room temperature (25° C.) in accordance with the JEITA ED-7306 standard of the Japan Electronics and Information Technology Industries Association using a shadow moiré measuring device (TherMoiré AXP, available from Akrometrix, LLC) as a measuring device. Specifically, a virtual plane calculated by the least squares method from all data of a substrate surface of a measurement region was used as a reference plane, a maximum value in a direction perpendicular from the reference plane was considered to be A, and a minimum value was considered to be B, and a value (coplanarity) of |A|+|B| was used as the package warpage value.

Cooling and Heating Cycle Test

The thermosetting resin composition was used to mount, onto a copper frame that had been Ag plated on the surface, a back surface gold silicon chip having a gold vapor-deposited layer provided on an 8 mm×8 mm bonding surface, and then the thermosetting resin composition was heated and cured (OV curing) at 190° C. for 60 minutes. The resulting product was subjected to a cooling and heating cycle process (an operation of raising the temperature from −55° C. to 150° C. and then cooling to −55° C. was considered to be one cycle, and this cycle was repeated 2000 times), and after this process, the presence or absence of peeling of the chip was observed using an ultrasonic microscope (FineSAT II, available from Hitachi Power Solutions Co., Ltd.) and evaluated according to the following criteria.

Determination Criteria

A: No peeling
C: Peeling present

TABLE 1

| | | | | Examples | | | | | |
|---|---|---|---|---|---|---|---|---|---|
| | | | Units | 1 | 2 | 3 | 4 | 5 | 6 |
| Thermosetting Resin Composition | (A) Silver particles | (A1) Silver particles of Synthesis Example 1 | parts by mass | 100 | | | 100 | 95 | 80 |
| | | (A2) Silver particles of Synthesis Example 2 | parts by mass | | 100 | | | | |
| | | (A3) Silver particles of Synthesis Example 3 | parts by mass | | | 100 | | | |
| | Silver particles other than component (A) | TC-505C | parts by mass | | | | | 5 | 20 |
| | | Ag-HWQ 1.5 μm | parts by mass | | | | | | |
| | | AgC-221PA | parts by mass | | | | | | |
| | | DOWA Ag nano powder-1 | parts by mass | | | | | | |
| | | DOWA Ag nano powder-2 | parts by mass | | | | | | |
| | (B) Thermosetting resin | Epoxy resin (YL983U) | parts by mass | 10 | 10 | 10 | | 10 | 10 |
| | | Acrylic resin (HEAA (registered trademark)) | parts by mass | | | | 10 | | |
| | | Bisphenol F | parts by mass | 2 | 2 | 2 | | 2 | 2 |
| | (C) Diluent | Butyl carbitol | parts by mass | 5 | 5 | 5 | 3 | 5 | 5 |
| | Other components | 2P4MHZ-PW | parts by mass | 0.1 | 0.1 | 0.1 | | 0.1 | 0.1 |
| | | Percumyl (registered trademark) D | parts by mass | | | | 0.5 | | |
| Evaluation Results | | Thermal conductivity λ | W/mK | 70 | 66 | 60 | 75 | 62 | 55 |
| | | Volume resistivity ρV | μΩ · cm | 20 | 12 | 10 | 9.2 | 24 | 26 |
| | | Viscosity | Pa · s | 200 | 180 | 163 | 150 | 180 | 162 |
| | | Thixotropic index | — | 4.8 | 4.7 | 4.5 | 4.4 | 4.5 | 4.6 |
| | | Pot life | days | 7> | 7> | 7> | 7> | 7> | 7> |
| | | Thermal resistance R | K/W | 0.23 | 0.22 | 0.24 | 0.25 | 0.25 | 0.27 |
| | | Warpage | μm | 78 | 75 | 72 | 82 | 74 | 70 |
| | | Cooling and heating cycle test | — | A | A | A | A | A | A |

| | | | Examples | | Comparative Examples | | | | |
|---|---|---|---|---|---|---|---|---|---|
| | | | 7 | 8 | 1 | 2 | 3 | 4 | 5 |
| Thermosetting Resin Composition | (A) Silver particles | (A1) Silver particles of Synthesis Example 1 | 70 | 60 | | | | | |
| | | (A2) Silver particles of Synthesis Example 2 | | | | | | | |
| | | (A3) Silver particles of Synthesis Example 3 | | | | | | | |

TABLE 1-continued

|  |  |  | | | | | | | |
|---|---|---|---|---|---|---|---|---|---|
| | Silver particles other than component (A) | TC-505C | 30 | 40 | 100 | | | | |
| | | Ag-HWQ 1.5 μm | | | | 100 | | | |
| | | AgC-221PA | | | | | 100 | | |
| | | DOWA Ag nano powder-1 | | | | | | 100 | |
| | | DOWA Ag nano powder-2 | | | | | | | 100 |
| (B) Thermosetting resin | | Epoxy resin (YL983U) | 10 | 10 | 10 | 10 | 10 | 10 | 10 |
| | | Acrylic resin (HEAA (registered trademark)) | | | | | | | |
| | | Bisphenol F | 2 | 2 | 2 | 2 | 2 | 2 | 2 |
| (C) Diluent | | Butyl carbitol | 5 | 5 | 5 | 5 | 5 | 5 | 5 |
| Other components | | 2P4MHZ-PW | 0.1 | 0.1 | 0.1 | 0.1 | 0.1 | 0.1 | 0.1 |
| | | Percumyl (registered trademark) D | | | | | | | |
| Evaluation Results | | Thermal conductivity λ | 50 | 50 | 42 | 8 | 4 | 30 | 36 |
| | | Volume resistivity ρV | 26 | 27 | 30 | 445 | 120 | 320 | 280 |
| | | Viscosity | 150 | 135 | 100 | 300 | 74 | 420 | 380 |
| | | Thixotropic index | 4.5 | 4.8 | 5.1 | 4.6 | 3.6 | 6.1 | 5.5 |
| | | Pot life | 7> | 7> | 7> | 7> | 7> | 1 | 1 |
| | | Thermal resistance R | 0.29 | 0.3 | 0.6 | 0.8 | 0.7 | 0.6 | 0.6 |
| | | Warpage | 71 | 68 | 66 | 60 | 65 | 95 | 94 |
| | | Cooling and heating cycle test | A | A | A | C | C | C | C |

Examples 1 to 8, in which thermosetting resin compositions containing the silver particles (A) (aggregated particles) were used, each exhibited low viscosity and excellent dispersibility. Furthermore, the cured products of these resin compositions exhibited high thermal conductivity and low warpage. Moreover, the semiconductor packages obtained using these thermosetting resin compositions all exhibited low thermal resistance of the bonded portion with the chip or the base material, and exhibited excellent adhesiveness without the observation of peeling of the chip after the cooling/heating cycle test. Therefore, a semiconductor device and electrical and/or electronic components excelling in reliability can be obtained by using the thermosetting resin composition of the present embodiment.

In Comparative Example 1, in which was used a thermosetting resin composition containing silver particles that did not form aggregates, the warpage of the cured product of the resin composition was small, and the thermal conductivity was good. However, with regard to sintering of the silver particles, in Comparative Example 1, sintering of the silver particles to the chip or the base material did not easily proceed, and therefore the thermal resistance of the bonded portion with the chip or the base material was large. Also, the specific surface area of the silver particles was small, and at the bonding interface, the adhesiveness in the cooling and heating cycle test was favorable due to resin adhesion.

In both Comparative Examples 2 and 3, in which thermosetting resin compositions containing silver particles that did not form aggregates were used, the warpage of the cured products of the resin compositions was small. However, Comparative Examples 2 and 3 exhibited poor sinterability, low thermal conductivity, high volume resistance, and high thermal resistance.

In Comparative Examples 4 and 5, in which thermosetting resin compositions containing silver nanoparticles were used, the amount of protective molecules contained in the resin composition was large in comparison to the aggregated particles of the examples described above, and the volume shrinkage of the cured products of the resin compositions increased due to the volatilization of the protective molecules after sintering, and therefore warpage was extensive. Furthermore, because the proportion of the protective molecules in the resin composition was large, the absolute amount of silver was small, and the thermal conductivity was low compared to the aggregated particles despite the favorable sinterability. Moreover, the specific surface area was large due to the use of nanoparticles, and the viscosity of the resin compositions was high, and thus workability (dispensability) was poor.

The invention claimed is:

1. A thermosetting resin composition comprising:
   (A) a plurality of silver particles comprising secondary particles having an average particle size from 0.5 to 5.0 μm, the secondary particles formed by an aggregation of primary particles having an average particle size from 10 to 100 nm; and
   (B) a thermosetting resin,
   wherein each of the plurality of the silver particles (A) is a hollow particle having a void within each respective particle, and
   wherein the thermal resistance of the thermosetting resin composition is 0.5 K/W or less when cured.

2. The thermosetting resin composition according to claim 1, wherein the plurality of the silver particles (A) has a tap density from 4.0 to 7.0 g/cm$^3$.

3. The thermosetting resin composition according to claim 1, wherein each of the plurality of the silver particles (A) has a positive thermal expansion coefficient at temperatures between 150° C. and 300° C.

4. The thermosetting resin composition according to claim 1, wherein the thermosetting resin (B) is contained in an amount from 1 to 20 parts by mass relative to 100 parts by mass of the plurality of the silver particles (A).

5. The thermosetting resin composition according to claim 1, wherein the thermosetting resin (B) is at least one selected from a cyanate resin, an epoxy resin, an acrylic resin, and a maleimide resin.

6. The thermosetting resin composition according to claim 1, further comprising (C) a diluent, wherein the diluent (C) is contained in an amount from 3 to 20 parts by mass relative to 100 parts by mass of the plurality of silver particles (A).

7. A semiconductor device formed by adhering a semiconductor element and a substrate through a die attach material containing the thermosetting resin composition described in claim 1.

8. Electrical and/or electronic components formed by adhering a heat-dissipating member and a heat-generating member through a heat-dissipating member adhesive material containing the thermosetting resin composition described in claim 4.

9. The thermosetting resin composition according to claim 1, wherein each of the plurality of silver particles (A) has a specific surface area from 0.5 to 1.5 $m^2/g$ as determined by the BET method, wherein the specific surface area includes external surfaces and accessible internal pore surfaces of the plurality of silver particles.

10. A method of producing a thermosetting resin composition comprising a plurality of silver particles, the plurality of silver particles each including secondary particles having an average particle size from 0.5 to 5.0 µm, the secondary particles formed by an aggregation of primary particles having an average particle size from 10 to 100 nm, the method comprising:

obtaining a silver ammine complex solution by adding ammonia water to an aqueous solution containing a silver compound; and obtaining a silver particle-containing slurry by reducing, with a reducing compound, a silver ammine complex contained in the obtained silver ammine complex solution, wherein the silver ammine complex solution is maintained between 0 and 20° C. when reducing the silver ammine complex, dispersing the silver particles of the silver particle-containing slurry in a thermosetting resin, and curing the thermosetting resin composition, wherein each of the plurality of the silver particles is a hollow particle having a void within each respective particle, and wherein the thermal resistance of the cured thermosetting resin composition is 0.5 K/W or less.

11. The method of producing the thermosetting resin composition particle according to claim 10, wherein the ammonia water is added in an amount from 2 to 50 mol per mole of silver in the aqueous solution containing the silver compound in the step of obtaining the silver ammine complex solution.

12. The method of producing the thermosetting resin composition particle according to claim 10, wherein the reducing compound is contained in an amount from 0.25 to 20.0 mol per mole of silver in the silver ammine complex, and a temperature of the silver ammine complex solution is less than 30° C. in the step of obtaining the silver particle-containing slurry.

13. The method of producing the thermosetting resin composition particle-according to claim 10, wherein the reducing compound is a hydrazine derivative.

14. The method of producing the thermosetting resin composition according to claim 10, further comprising, after the step of obtaining the silver particle-containing slurry, introducing a protecting group into a silver particle by adding an organic protecting compound to the silver particle-containing slurry obtained.

* * * * *